（12) United States Patent
Naccache (10) Patent No.: US 8,577,090 B2
(45) Date of Patent: Nov. 5, 2013

(54) BIOMETRIC AUTHENTICATION METHOD, AUTHENTICATION SYSTEM, CORRESPONDING PROGRAM AND TERMINAL

(75) Inventor: David Naccache, Paris (FR)

(73) Assignee: Compagnie Industrielle Et Financiere d'Ingenierie "Ingenico", Neuilly sur Seine (FR)

( * ) Notice: Subject to any disclaimer, the term of this patent is extended or adjusted under 35 U.S.C. 154(b) by 1199 days.

(21) Appl. No.: 12/250,377

(22) Filed: Oct. 13, 2008

(65) Prior Publication Data

US 2009/0097714 A1    Apr. 16, 2009

(30) Foreign Application Priority Data

Oct. 12, 2007    (FR) ..................................... 07 58297

(51) Int. Cl.
*G06K 9/00*    (2006.01)
(52) U.S. Cl.
USPC ........................................................ 382/115
(58) Field of Classification Search
USPC ........... 382/115, 127; 235/380; 340/5.1, 5.92, 340/5.52, 5.53, 5.8, 5.86, 5.82, 5.84; 704/246, 273; 902/3, 4, 25
See application file for complete search history.

(56) References Cited

U.S. PATENT DOCUMENTS

| | | | | |
|---|---|---|---|---|
| 6,092,199 | A | 7/2000 | Dutcher et al. | 713/201 |
| 7,564,994 | B1 * | 7/2009 | Steinberg et al. | 382/118 |
| 2001/0026632 | A1 * | 10/2001 | Tamai | 382/116 |
| 2004/0101173 | A1 * | 5/2004 | Hara et al. | 382/124 |
| 2005/0238207 | A1 * | 10/2005 | Tavares | 382/115 |
| 2007/0185869 | A1 * | 8/2007 | Kirnak | 707/6 |

FOREIGN PATENT DOCUMENTS

| | | |
|---|---|---|
| WO | WO 03/029938 | 4/2003 |
| WO | WO 2004/029938 | 4/2003 |
| WO | WO 03/077082 | 9/2003 |
| WO | WO 03/077092 | 9/2003 |

OTHER PUBLICATIONS

O'Shea et al. "Biometric Authentication Management," Dec. 27, 1999. (XP-002274831).
French Search Report from counterpart foreign application No. FR 07/58297.

* cited by examiner

*Primary Examiner* — Edward Park
(74) *Attorney, Agent, or Firm* — David D. Brush; Westman, Champlin & Koehler, P.A.

(57) ABSTRACT

A biometric authentication method if provided for an individual to be authenticated amongst a very large quantity of individuals with an authentication system storing a set of reference information each associated to one of the individuals. The reference information is distributed across a plurality of sub-databases. The method includes a phase of adding reference information representative of a new individual, including selecting the sub-database that is best adapted to store the reference information to be added. A phase of authentication includes: provision by the individual of authentication biometric information and of an identifier forming addressing information, designating at least one of said sub-databases likely to contain the reference information representative of said individual; and searching amongst the reference information stored by the authentication system, of reference information corresponding to the individual, the searching being carried out on a subset of said set of reference information, identified by the addressing information.

4 Claims, 4 Drawing Sheets

BIOMETRIC AUTHENTICATION METHOD, AUTHENTICATION SYSTEM, CORRESPONDING PROGRAM AND TERMINAL

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of authenticating individuals via biometrics.

More precisely, the disclosure relates to biometric authentication systems that group together a very large number of individuals.

BACKGROUND OF THE DISCLOSURE

Biometrics is commonly used to identify and/or authenticate individuals based on individual physical characteristics.

Such an identification via biometrics, implemented by a biometric authentication system, comprises the three following main steps:
  capturing of a reference biometric sample coming from the authorized individual (for example a reference image of an authorized individual);
  creation of a reference file, or "reference signature" (which comprises at least one characteristic element of the reference image), by a specific treatment applied to the reference biometric sample, then storage of this reference file;
  verification wherein, in the same way as with the aforementioned steps of capturing and of creating, a capture of a biometric sample to be compared coming from the individual to be authenticated and the creation of a file to be compared, or "signature to be compared" are carried out, then a comparison of the reference file with the file to be compared in order to determine their rate of similarity and take the decision that is required is achieved.

As such, the information stored is not biometric samples, but mathematical models of these samples that distinguish one biometric sample from another. This model is called a "signature" or a "template".

The creation of a reference signature is carried out during a phase referred to as enrolment (or learning) that groups together the steps of capturing the reference biometric sample, creating and storing the reference signature and storing the information on the identity of the individual such as his last name, first name, identifier (personal identification number).

The authentication of an individual via biometrics can in particular be based on the measurement (or capture) of at least one of the following biometric samples, or a combination of one or several of the following biometric samples:
  his fingerprint;
  his palm print (hand print);
  the print of his retina;
  the print of his iris;
  the print of his face (the facial shape);
  . . .

A disadvantage of these biometric authentication systems of prior art lies in their slowness when they are used to reference a large number of individuals (for example to control the access to the underground in a large city or to authenticate a user of a bank card).

Indeed, the duration of the step of verification, during which the authentication decision properly speaking is taken, depends on the number of referenced individuals in the authentication system. The more referenced individuals there are, the higher the number of potential comparisons to be made in order to determine or not determine the authentication of an individual is.

As such, the higher the number of referenced individuals is, the slower the system is.

Another disadvantage of these biometric authentication systems of prior art lies in the increasing risk of authentication errors according to the number of referenced individuals.

Indeed, the higher the number of referenced individuals is, the more the system is likely to reference several pieces of close biometric information, each corresponding to different individuals. Then, during the authentication phase, such a system has a greater risk of authentication errors, due to this proximity of the biometric information referenced for different individuals.

SUMMARY

An aspect of the disclosure relates to a biometric authentication method of an individual to be authenticated amongst a very large quantity of individuals with an authentication system storing a set of reference information each associated with one of said individuals, comprising the steps of:
  provision by said individual to be authenticated of authentication biometric information;
  searching amongst said reference information stored by said authentication system, for reference information corresponding to said individual to be authenticated, according to said authentication biometric information.

According to an aspect of the disclosure, said reference information is distributed in a plurality of sub-databases, and said individual to be authenticated provides, in addition to said biometric information, an identifier forming the addressing information, designating at least one of said sub-database likely to contain the reference information representative of said individual to be authenticated, in such a way that said step of searching is carried out over a subset of said set of reference information, identified by said addressing information.

As such, an aspect of the disclosure is based on a new and inventive approach of biometric authentication in a system referencing a very large number (for example, millions) of individuals, according to which the reference information associated with the individuals of the system is distributed in a plurality of sub-databases and the authentication of an individual is carried out on one of these sub-databases, identified by addressing information that is proper to it provided by the individual to be authenticated, in addition to his biometric information.

This addressing information is for example, in a first embodiment, an identification code with several digits, delivered by the individual before providing his authentication biometric information.

This approach makes it possible to rapidly identify an individual, including in a system comprising a very large number of referenced individuals, by breaking down all of the reference information into several subsets.

In addition, the method according to an aspect of the disclosure makes it possible in particular to associate to each individual a code that is proper, short, for example that does not exceed four digits. This approach must not be confused with the systems that allocate to each user an identifier that is proper to him (which, in the case of a system referencing more than a million individuals, would suppose an identifier proper to each individual that would have to include a minimum of seven digits. Indeed, such a length is hardly ergonomic, and generates key-entry errors and forgetfulness). The latter is made possible, according to an aspect of the disclosure, by the use of a plurality of sub-databases in order to reference the individuals in the system.

According to a particular characteristic of an aspect of the disclosure, said biometric information belongs to the group comprising:
fingerprints;
palm prints;
retina prints;
iris prints;
facial shapes;
combinations of said aforementioned biometric information.

In particular, the biometric authentication method according to an aspect of the disclosure comprises a phase of adding reference information representative of a new individual, comprising a step of selecting the sub-database that is best suited for storing said reference information to be added, according to a criterion of maximising a distance in relation to the reference information that is already present in said sub-database.

As such, the method according to an aspect of the disclosure makes it possible to judiciously and effectively distribute the reference information of the individuals so as to avoid "collisions" or the risks of error due to the referencing of several individuals presenting biometric characteristics that are close in the same sub-database. Such collisions could result in particular, at the time of the authentication properly speaking of the individual, in authentication errors for an individual that is correctly referenced by the system.

Indeed, according to an aspect of the disclosure, the adding of new reference information for a new individual in the system is carried out according to the reference information that is already stored. As such, the sub-database wherein is added the new reference is chosen in such a way that the new reference information is sufficiently distant from the other reference information stored in this sub database.

This calculation of distance between the new reference information and the information already stored is known by those skilled in the art in the field of biometric authentication.

According to another particular embodiment, said addressing information is obtained using identification biometric information delivered by said individual (not via an identifier introduced via a keyboard).

As such, the individual does not have to memorize addressing information, even if it is simple, such as for example a code with several digits, but must simply provide an additional piece of biometric information (where applicable in a single capture, simultaneously to the authentication biometric information) which is used to calculate an addressing identifier for a sub-database.

The method of authentication according to this embodiment makes it possible to minimize the risks of error or of forgetting a code that has to be provided by the individual to be authenticated, and renders the authentication phase more ergonomic for the user of the authentication system.

According to a particular aspect of the disclosure, the method comprises a step of transforming said identification biometric information into addressing information, belonging to the group comprising:
minutia barycentre calculations;
mathematical transformations.

As such, after application of a mathematical transformation on the identification biometric information provided by the individual to be authenticated, the identifier of the sub-database wherein is stored the reference information associated to the individual in question is obtained.

According to a particular embodiment, said authentication takes into account said authentication biometric information and, at least in the case of need, said identification biometric information.

As such, the identification biometric information, which also corresponds to a biometric characteristic of the individual, can be used to secure (confirm or invalidate) the authentication based on the authentication biometric information, systematically, or only in the case of doubt on the first authentication.

According to a particular embodiment, the method comprises, using a first and a second piece of biometric information:
a first authentication wherein said first biometric information is an identification biometric information and the second biometric information is an authentication biometric information;
a second authentication wherein said first biometric information is an authentication biometric information and the second biometric information is an identification biometric information;
a consolidation of the results of said first and second authentications.

As such, according to certain predetermined criteria, the method according to an aspect of the disclosure comprises two steps of authentication, based respectively on the authentication biometric information and the identification biometric information delivered by the individual. In this case, two pieces of reference information are associated to each individual referenced in the system and stored in the same database, identified by the intermediary of the identification information, or in separate databases.

According to a particular aspect of the disclosure, said step of searching for the authentication comprises:
a first step of searching in the sub-database identified by said addressing information;
if said first step of searching is unsuccessful, a second step of searching in at least one sub-database identified by an index close to said addressing information.

As such, the method according to an aspect of the disclosure makes it possible to overcome any possible errors in calculating the addressing information of the sub-database, using the identification biometric information.

Indeed, the capture of biometric information is subjected to various random items, known in the field of biometrics (cut on a finger for a fingerprint, loud background noise for a vocal print, etc.), and thus causes differences, which are sometimes remarkable, between several pieces of biometric information delivered by the same individual. It can therefore be deduced that a transformation subsequently applied to two pieces of biometric information that are slightly different, although delivered by the same individual, can generate two pieces of addressing information for sub-databases that are slightly different.

The method according to an aspect of the disclosure therefore takes into consideration these risks of errors in calculation, which are more or less significant according to the transformation used, by providing the possibility, in the event of a first step of authentication that is unsuccessful, to carry out a second step of authentication, on a subdata database of which the addressing information varies slightly in relation to that calculated.

Another aspect of the disclosure also relates to a biometric authentication system of an individual to be authenticated amongst a very large quantity of individuals comprising means of storing a set of reference information each associated to one of said individuals, and comprising:

means of obtaining, by said individual to be authenticated, an authentication biometric information;

means of searching amongst said reference information stored, for a reference information corresponding to said individual to be authenticated, according to said authentication biometric information.

According to an aspect of the disclosure, such a biometric authentication system comprises means of distributing said reference information in a plurality of sub-databases, and means of obtaining, by said individual to be authenticated, an identifier forming addressing information, designating at least one of said sub-databases likely to contain the reference information representative of said individual to be authenticated, in such a way that said means of searching be implemented on a subset of said set of reference information, identified by said addressing information.

Such a system is in particular adapted to implement the method of authentication described previously.

Such a system can in particular be an authentication system allowing access to public transportation, or an authentication system of a banking organization.

The disclosure also relates to a computer programme product that can be downloaded from a communication network and/or recorded onto a medium that can be read by computer and/or executed by a processor, comprising programming code instructions for implementing the biometric authentication method described previously.

Finally, the disclosure relates to a terminal intended for the biometric authentication of an individual to be authenticated amongst a very large quantity of individuals with an authentication system storing a set of reference information each associated to one of said individuals.

According to an aspect of the disclosure, such a terminal comprises:

means of capturing an identification biometric information of said individual to be authenticated;

means of transforming said identification biometric information into addressing information;

means of capturing the authentication biometric information of said individual to be authenticated, in such a way that the searching for said reference information corresponding to said authentication biometric information is carried out by said authentication system on a subset of said set of reference information, identified by said addressing information.

Such a terminal is in particular able to implement the steps of the method of authentication described previously taking place in the terminal.

Such a terminal can in particular be a payment terminal, a terminal making it possible to access a building or public transportation (underground), etc.

DETAILED DESCRIPTION OF ILLUSTRATIVE EMBODIMENTS

Other characteristics and advantages shall appear more clearly when reading the following description of a particular embodiment, provided as a simple and not limited example, and the annexed drawings, amongst wherein:

FIG. 2b shows an alternative of the embodiment according to FIG. 2a;

DETAILED DESCRIPTION OF ILLUSTRATIVE EMBODIMENTS

1. General Principle

The general principle of an aspect of the disclosure is based on the distribution, in a plurality of sub-databases, of all of the biometric information relative to the individuals referenced in a biometric authentication system, in such a way as to avoid the problems of slowness and of collision that are inherent to the authentication systems that reference a very large number of individuals.

Such systems can be used for example to control the access to the underground in a large city, and as such reference a very large number of users.

The following shall consider, to show the method according to an aspect of the disclosure, such a system making it possible to control, via biometric authentication, access to the underground by removing the need for users to carry a transport document (in the form of a ticket, subscription card or other). In this case, a user desiring to access the underground is authenticated thanks to one or several biometric characteristics.

According to an aspect of the disclosure, in order to avoid a excess amount of slowness in the system, and in order to make it possible for the referenced users to not be slowed down by the biometric authentication and therefore to access the underground quickly, the reference information for all of the users is distributed across several database, called sub-databases, each one being designated by a number, called addressing information.

This addressing information makes it possible to subsequently direct to the sub-database designated as such the searching for the reference information with the purpose of authenticating the user, or of the individual to be authenticated.

As such, instead of verifying the authenticity of an individual amongst all of the referenced individuals, the method according to an aspect of the disclosure makes it possible to verify the authenticity of an individual in a subset of referenced individuals, thus reducing the length of authentication.

Figure 1:
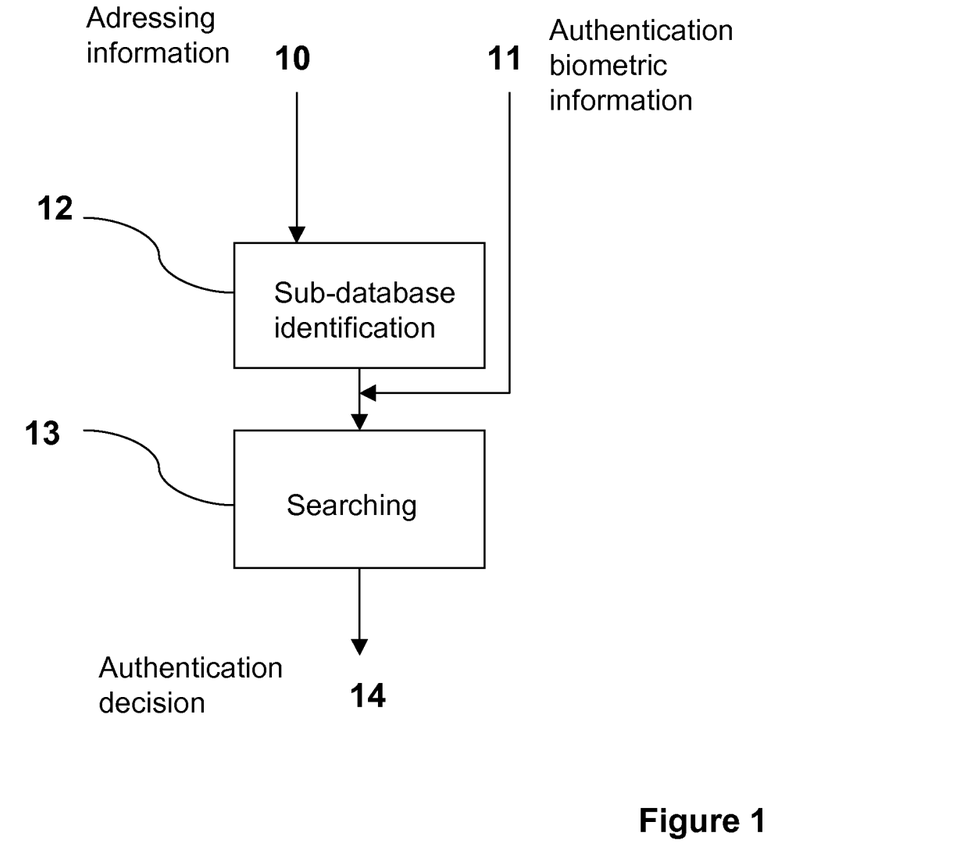
FIG. 1 shows the main steps of the biometric authentication method according to an aspect of the disclosure.

In relation to FIG. 1, the main steps of the biometric authentication method according to an aspect of the disclosure will now be presented.

At the time of access to the underground, a user must provide two pieces of information via the interface of the authentication system:

addressing information 10;

authentication biometric information 11.

The addressing information 10 is used during a step 12 of identifying a sub-database, which shall subsequently be used for the searching of reference information corresponding to the user to be authenticated.

2. First Embodiment

In a first embodiment, this addressing information corresponds directly to the index of a sub-database, for example in the form of a 4-digit code.

Once the sub-database has been identified, the authentication properly speaking takes place, during a phase of searching 13, which takes into account the biometric information 11 delivered by the individual, in order to deliver an authentication decision 14.

The authentication biometric information 11 corresponds to a "simple" biometric sample of the individual to be authenticated, such as a fingerprint, a palm print, a retina print, an iris print, a facial shape, etc., or to a combination of several of these "simple" samples, for example a combination of a fingerprint and an iris print.

The phase of searching 13 is conventionally comprised of at least two steps: a first step consisting in determining a biometric "signature" of the user to be authenticated, using the authentication biometric information delivered, and a second step consisting in comparing this biometric "signature" with the signatures, or reference information contained in the sub-databases identified beforehand, so as to deliver an authentication decision.

The first step corresponds to the application of a special conventional treatment to the biometric sample, in such a way as to obtain a signature that can then be compared with other information of the same type. This signature is obtained via signature creation algorithms, known per se in the field of biometrics.

The second step carries out successive comparisons of the signature obtained during the preceding step, with each of the pieces of reference information, or reference signatures stored in the sub-database involved. According to predetermined criteria, an authentication decision is delivered, positive when a reference signature corresponds to the signature obtained, negative when none of the reference signatures contained in the sub-database corresponds.

As such, it is easily understood that this second step of authentication is faster in the method according to an aspect of the disclosure, since the maximum number of comparisons that it can carry out corresponds to the number of signatures stored in the sub-database, and not to the total number of signatures stored in the authentication system.

In addition, another advantage of the method of authentication according to a first embodiment lies in the distribution itself of the reference information across the various sub-databases.

Indeed, it is possible, to minimize the risks of collision, i.e. the risks of having, in the same database, close reference information that is likely to be considered as identical by an authentication system. This advantage is directly linked to the use of a plurality of sub-databases containing all of the reference information and to the choice of the sub-databases at the time when a new individual to be referenced is added.

The more referenced individuals an authentication system includes, the higher the probability is of referencing individuals that have close biometric characteristics, which may be considered as identical during an authentication.

However, the method according to an aspect of the disclosure makes it possible to reference in different sub-databases individuals that have close biometric characteristics, and as such makes it possible to minimize the risks of authentication error linked to close reference information.

As such, the method according to an aspect of the disclosure comprises a particular phase of adding a new individual to be referenced, making it possible to determine the most appropriate sub-database for storing the reference information of the individual to be added, and then in providing this individual with the addressing information corresponding to the index of the chosen sub-database.

The choice of this sub-database can in particular take into account the reference information that is already contained in each one of the sub-databases of the authentication system.

As such, the method according to an aspect of the disclosure first carries out a search, in each sub-database, for the reference information considered as the closest to that to be added.

For example, a proximity criterion (calculation of a distance), defined beforehand, is applied to each of the pieces of reference information of each of the sub-databases, delivering for each sub-database a positive or negative result, indicating if at least one reference information considered to be close to that to be added has been found or not.

This proximity criterion can for example consist of a certain number of points of concordance to be verified, beyond which a reference information is considered as close to that to be added.

Then, if at least one sub-database does not comprise any reference information considered to be close, then the reference information of the new individual is added to this sub-database. Preferentially, the sub-database that maximizes the distance with all of the references that have already been stored is chosen.

However, if all of the sub-databases contain at least one reference information considered to be close, either a larger proximity criterion can be applied and the calculation of the choice of the sub-database is carried out again, a new sub-database can be created in order to reference this new individual in it.

Once the sub-database has been chosen, a corresponding addressing information is provided to the individual added to the authentication system, for example in the form of a four-digit code corresponding to the index of the sub-database in the system.

3. Second Embodiment

According to this embodiment of the method of authentication, the individual to be authenticated is allowed to be freed from directly providing the addressing information at the time of his authentication.

Indeed, as indicated hereinabove, the method according to an aspect of the disclosure uses two pieces of information delivered by the user: addressing information 10 and biometric information 11 (FIG. 1).

Figure 2A:
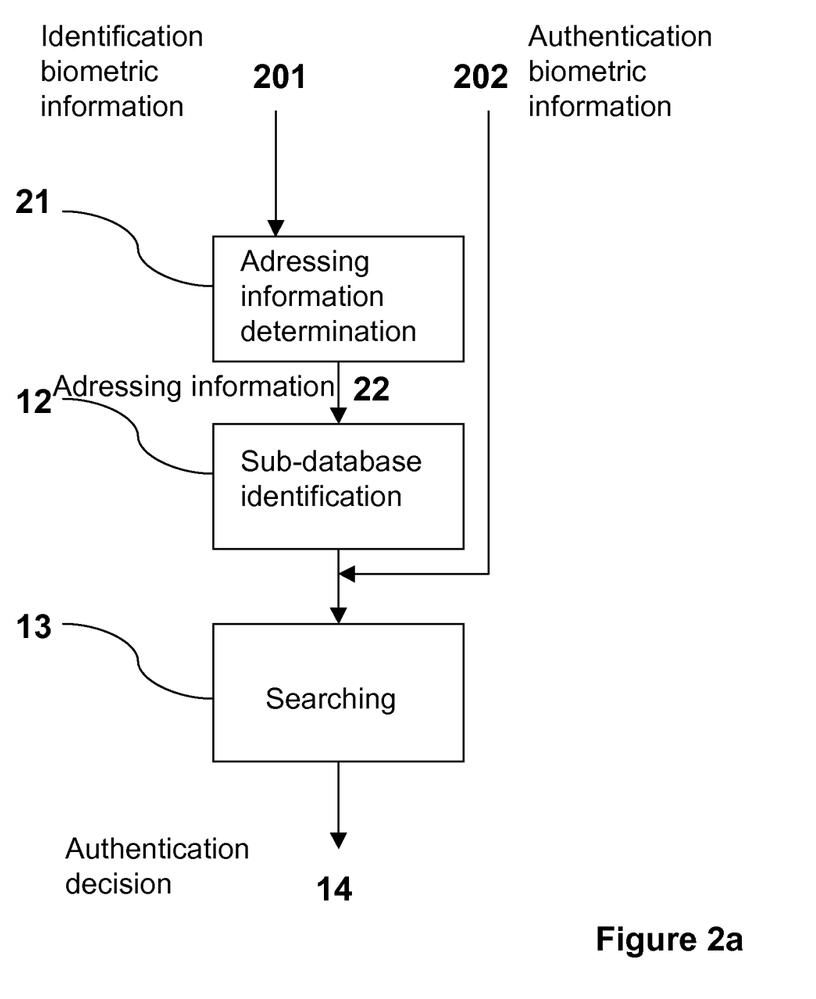
FIG. 2a shows the steps of a particular embodiment of the method according to an aspect of the disclosure.

In this embodiment, shown in FIG. 2a, the individual to be authenticated delivers two pieces of biometric information 201, called identification biometric information, and 202, called authentication biometric information. These two pieces of information can come from the same capture (for example palm print and fingerprint), or from two separate captures.

The identification biometric information 201 is used, during a step 21, in order to determine the addressing information 22 designating the sub-database that will be used to carry out the search for authentication.

This addressing information 22 is obtained for example by applying a mathematical transformation to the identification biometric information 201. Such a transformation is for example the calculation of the minutia barycentre.

The following steps are the same as described previously, i.e. a step 12 of identifying the sub-database using the addressing information 22, followed by a step of searching 13, taking into account the authentication biometric information 202 provided by the individual to be authenticated, in order to deliver an authentication decision 14.

This embodiment thus makes it possible for all of the individuals of the authentication system to not have to memorize and provide a code corresponding to the addressing information, since this information is extracted from biometric information provided by the individual.

With this embodiment, it may however be preferable to provide certain special precautions, since it implements a mathematical transformation in order to obtain the addressing information using a biometric sample.

Indeed, the biometric sample delivered by the user is subjected to random items that are well known in the field of biometrics (especially at the time the sample is captured, for example a cut on a finger for a fingerprint, loud background noise for a vocal print, etc.). These random items are taken into account in the various authentication calculations, but can also generate errors in the calculation of the addressing information, and deliver an index corresponding to an incorrect sub-database, i.e. a sub-database that does not correspond to the individual to be authenticated. It is well understood that in this case, the authentication of the individual will fail, since the comparisons of the authentication phase are done in a sub-database wherein the reference information corresponding to the individual to be authenticated is not found.

In order to minimize the risks of error in calculating the addressing information using a biometric sample, the method according to an aspect of the disclosure provides, according to a first alternative of this embodiment, to use a mathematical transformation like an index conversion function, i.e. a continuous function. Indeed, with this type of function, a low amount of reading errors in the biometric sample results in low amount of error in the calculation of the addressing information, and in low risks of erroneous identification of a sub-database.

It can also be provided to secure the authentication by adding additional authentication steps in sub-databases with indexes that are close to that indicated by the addressing information obtained, in the event of a negative authentication in the sub-database that was first identified.

Figure 2B:
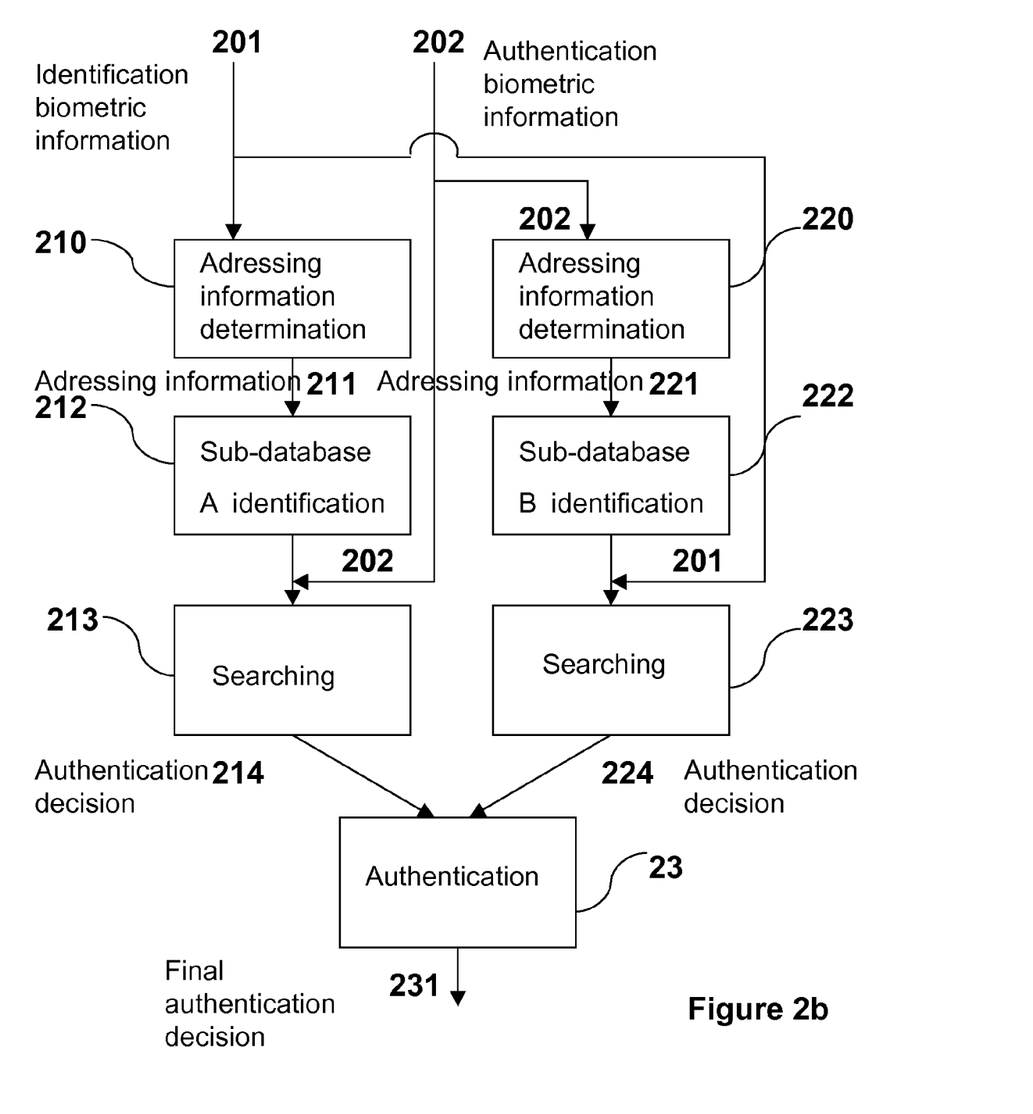

A second alternative of this embodiment, shown in FIG. 2b, uses the two pieces of biometric information 201 for identification and 202 for authentication in order to determine addressing information of a sub-database as well as to determine a signature used for the authentication, in two authentication steps, implemented in parallel or successively.

The sample 201 is used to determine a first addressing information 211, during a step 210, by applying a mathematical transformation. The corresponding sub-database A is identified during a step 212.

A first step of searching 213 for the authentication is carried out, by comparing a first signature, determined using authentication biometric information 202, with the reference information stored in the sub-database A, delivering as such a first authentication decision 214.

At the same time, or successively, the authentication biometric information 202 is also used to determine a second addressing information 221, during a step 220, through the application of a mathematical transformation. The corresponding sub-database B is identified during a step 222.

A second step of searching 223 for the authentication is then implemented, using the identification biometric information 201, used in this case in order to determine a second signature. The latter is then compared to the reference information stored in the second sub-database B, in order to deliver a second authentication decision 224.

The two steps of authentication thus each deliver one authentication decision, based respectively on the authentication biometric information 202 and on the identification biometric information 201.

The final authentication decision 231 is taken according to the two results 214 and 224, during a step 23.

For example, if the two decisions are positive, the final decision 231 will also be positive.

However, if the two decisions 214 and 224 are negative, or one of the two is negative, then the final decision will also be negative.

This alternative thus makes it possible to secure the authentication of an individual by carrying out two authentications, simultaneous or successive, using two biometric samples delivered by the individual. This alternative requires the use of two sub-databases for the authentication of an individual. The first sub-database is designated by a first addressing information determined using the first biometric sample (or identification biometric information) and contains reference information comparable to a signature determined using the second biometric sample. The second sub-database is designated by a second addressing information determined using the second biometric sample (or authentication biometric information) and contains reference information comparable to a signature determined using the first biometric sample.

4. Third Embodiment

Figure 3:
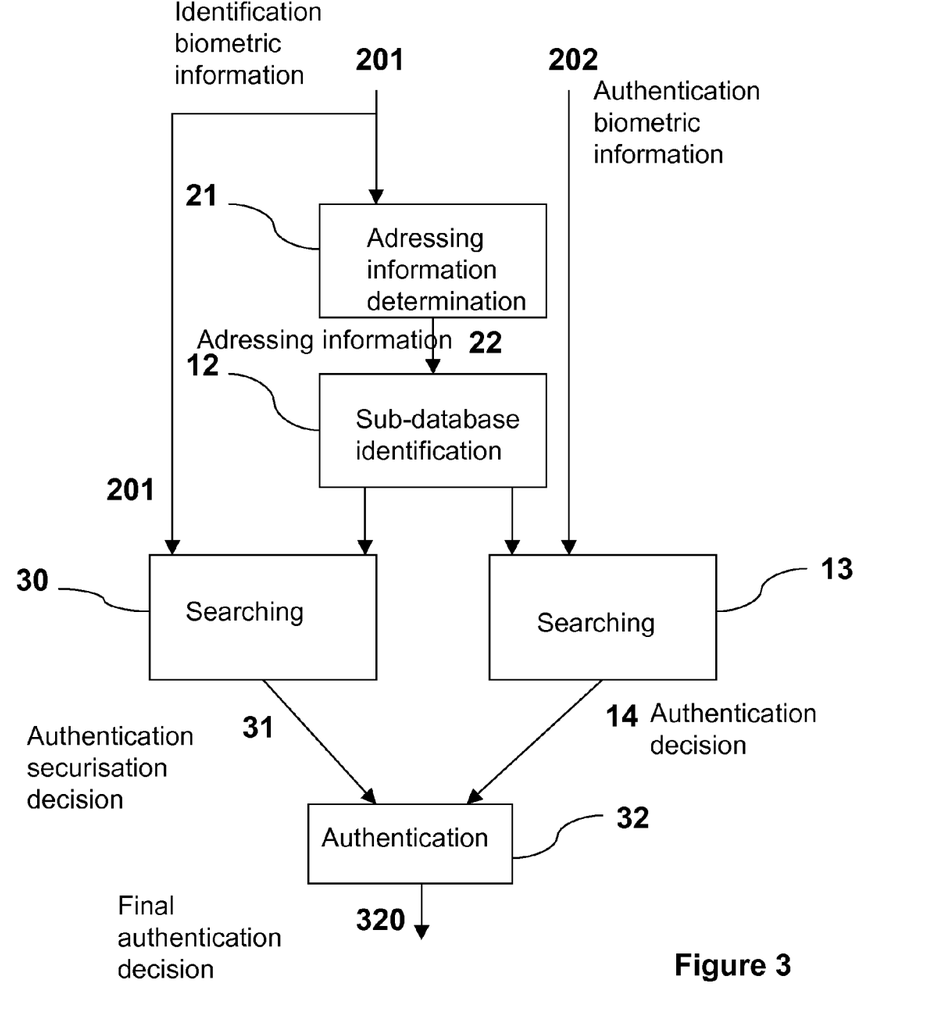
FIG. 3 shows the steps of another particular embodiment of the method according to an aspect of the disclosure.

FIG. 3 shows a third embodiment of the method, having steps of securing the authentication, by taking into account several biometric samples delivered by the individual to be authenticated.

As in the alternative described hereinabove (paragraph 3), the individual, or the user of the underground in our example, provides at least two biometric samples 201, or identification biometric information, and 202, or authentication biometric information.

The first sample 201 is used during a step 21 in order to determine the addressing information 22 of the sub-database to be used subsequently, as described in the preceding paragraph. The following step 12 uses this addressing information 22 in order to identify the sub-database.

As in the alternative described previously, the method then uses, during a step 13 of searching, the second biometric sample 202 (authentication biometric information) provided by the user, in order to deliver an authentication decision 14.

In addition, the first biometric sample 201 (identification biometric information) is again used in a second step of searching 30, delivering itself an authentication decision, called authentication securisation decision 31.

As such, the sub-database designated by the addressing information contains reference information of the type corresponding to the signature coming from the first biometric sample as well as reference information of the type corresponding to the signature coming from the second biometric sample.

The two decisions 14 and 31 are then used in a step 32 to deliver the final authentication decision 320.

As such, if the authentication decision 14 and the authentication securisation decision are positive, the method according to this alternative will deliver a positive final decision. If the two decisions 14 and 32 are negative, or if one of the two decisions is negative, the method will deliver a final negative decision.

The second step of searching 30 can be optional, and implemented only in the case of doubt on the first decision 14.

An aspect of the disclosure provides a biometric authentication technique that is rapid and reliable, in the case of a system referencing a very large number of individuals.

An aspect of the disclosure provides such a technique that is also ergonomic for the user.

An aspect of the disclosure provides such a technique that is not expensive and that is easy to implement.

Although the present disclosure has been described with reference to one or more examples, workers skilled in the art will recognize that changes may be made in form and detail without departing from the scope of the disclosure and/or the appended claims.

The invention claimed is:

1. A biometric authentication method of an individual to be authenticated amongst a very large quantity of individuals with an authentication system storing a set of reference information, each associated to one of said individuals, said reference information being distributed across a plurality of sub-databases, comprising:
   a phase of adding reference information representative of a new individual in one of said sub-databases, comprising:
      a step of selecting the sub-database that is best adapted to store said reference information to be added, said reference information being representative of said new individual, and said sub-database being selected according to a criterion of maximizing a distance between the reference information that is already present in said sub-database and said reference information to be added, in order to avoid risk of authentication errors between individuals already referenced in said sub-database and said new individual, and
      a step of providing said new individual with an identifier forming addressing information and corresponding to an index of said selected sub-database; and
   a phase of authentication of said individual to be authenticated comprising the following steps:
      provision by said individual to be authenticated of authentication biometric information and of an identifier forming addressing information, designating at least one of said sub-databases likely to contain the reference information representative of said individual to be authenticated; and
      searching amongst said reference information stored by said authentication system, of reference information corresponding to said individual to be authenticated, according to said authentication biometric information, said searching being carried out on a subset of said set of reference information, identified by said addressing information.

2. Biometric authentication method set forth in claim 1, wherein said biometric information belongs to the group comprising:
   fingerprints;
   palm prints;
   retina prints;
   iris prints;
   facial shapes;
   combinations of said aforementioned biometric information.

3. A biometric authentication system of an individual to be authenticated amongst a very large quantity of individuals comprising:
   a set of reference information, each associated to one of said individuals and stored on a computer-readable medium, and
   a processor configured by program code instructions to authenticate the individual, wherein the instructions comprise:
      instructions configured to distribute said reference information in a plurality of sub-databases,
      instructions configured to add reference information representative of a new individual in one of said sub-databases, comprising:
         instructions configured to select the sub-database that is best adapted to store said reference information to be added, said reference information being representative of said new individual, and said sub-database being selected according to a criterion of maximizing a distance between the reference information that is already present in said sub-database and said reference information to be added, in order to avoid risk of authentication errors between individuals already referenced in said sub-database and said new individual, and
         instructions configured to provide said new individual with an identifier forming addressing information and corresponding to an index of said selected sub-database; and
      instructions configured to authenticate said individual to be authenticated, comprising:
         instructions configured to obtain, by said individual to be authenticated, authentication biometric information and an identifier forming addressing information, designating at least one of said sub-databases likely to contain the reference information representative of said individual to be authenticated; and
         instructions configured to search amongst said reference information stored, for reference information corresponding to said individual to be authenticated, according to said authentication biometric information, said searching being carried out on a subset of said set of reference information, identified by said addressing information.

4. A non-transitory computer-readable medium comprising a computer program product recorded thereon and comprising programming code instructions for implementation of a biometric authentication method of an individual to be authenticated amongst a very large quantity of individuals with an authentication system storing a set of reference information each associated to one of said individuals, when the program is executed by a processor, said reference information being distributed across a plurality of sub-databases, wherein the method comprises:
   a phase of adding reference information representative of a new individual in one of said sub-databases, comprising:
      a step of selecting the sub-database that is best adapted to store said reference information to be added, said reference information being representative of said new individual, and said sub-database being selected according to a criterion of maximizing a distance between the reference information that is already present in said sub-database and said reference information to be added, in order to avoid risk of authentication errors between individuals already referenced in said sub-database and said new individual, and
      a step of providing said new individual with an identifier forming addressing information and corresponding to an index of said selected sub-database; and
   a phase of authentication comprising the following steps:
      provision by said individual to be authenticated of authentication biometric information and of an identifier forming addressing information, designating at least one of said sub-databases likely to contain the reference information representative of said individual to be authenticated; and searching amongst said reference information stored by said authentication system, of reference information corresponding to said individual to be authenticated, according to said authentication biometric information, said searching being carried out on a subset of said set of reference information, identified by said addressing information.

* * * * *